United States Patent
Livshits et al.

(10) Patent No.: US 11,960,834 B2
(45) Date of Patent: Apr. 16, 2024

(54) READER MODE-OPTIMIZED ATTENTION APPLICATION

(71) Applicant: Brave Software, Inc., San Francisco, CA (US)

(72) Inventors: Benjamin Livshits, London (GB); Peter Snyder, San Francisco, CA (US); Andrius Aucinas, London (GB)

(73) Assignee: Brave Software, Inc., San Francisco, CA (US)

( * ) Notice: Subject to any disclaimer, the term of this patent is extended or adjusted under 35 U.S.C. 154(b) by 0 days.

(21) Appl. No.: 16/589,051

(22) Filed: Sep. 30, 2019

(65) Prior Publication Data

US 2021/0097134 A1 Apr. 1, 2021

(51) Int. Cl.
| | |
|---|---|
| *G06F 40/14* | (2020.01) |
| *G06F 16/93* | (2019.01) |
| *G06F 16/957* | (2019.01) |
| *G06F 16/958* | (2019.01) |
| *G06F 40/106* | (2020.01) |
| *G06F 40/197* | (2020.01) |
| *G06F 40/109* | (2020.01) |

(52) U.S. Cl.
CPC .......... *G06F 40/197* (2020.01); *G06F 16/94* (2019.01); *G06F 16/9577* (2019.01); *G06F 16/986* (2019.01); *G06F 40/106* (2020.01); *G06F 40/14* (2020.01); *G06F 40/109* (2020.01)

(58) Field of Classification Search
CPC .......... G06F 16/80; G06F 16/90; G06F 40/00; G06F 40/197; G06F 16/94; G06F 16/9577; G06F 16/986; G06F 40/106; G06F 40/14; G06F 40/109; G06F 40/103; G06F 40/143; G06F 40/154

See application file for complete search history.

(56) References Cited

U.S. PATENT DOCUMENTS

| | | | |
|---|---|---|---|
| 2006/0139312 A1* | 6/2006 | Sinclair, II | G06F 3/0481 345/156 |
| 2010/0205523 A1* | 8/2010 | Lehota | G06F 16/9577 715/235 |

(Continued)

OTHER PUBLICATIONS

"How browsers work" by Garsiel et al, published Aug. 5, 2011 and retrieved from https://web.dev/howbrowserswork/ (Year: 2011).*
Arc90 Inc., Readability.js README.md, 2010, https://github.com/mozilla/readability/blob/master/README.md, accessed Dec. 31, 2019, pp. 1-4.

(Continued)

*Primary Examiner* — Sanchita Roy
(74) *Attorney, Agent, or Firm* — Holland & Hart LLP

(57) ABSTRACT

An attention application, such as a web browser, includes a pipeline optimized for faster, more secure, and more private, viewing of hypermedia documents using a reader mode. The reader mode is "always on" in the sense that a classifier runs on every web page and every compatible page is rendered in the reader mode and not rendered in full, referred to as the bloat page. Significant time savings are gained by avoiding fetching and rendering the bloat page at all because the bloat page devours network bandwidth and computing resources. Avoiding loading the bloat page also avoids exposing the user to what are often abusive privacy infringements and security vulnerabilities from running executable code in the browser, while providing an uncluttered viewing experience of content that is actually of interest to the user.

21 Claims, 10 Drawing Sheets

(56) References Cited

U.S. PATENT DOCUMENTS

| | | | | |
|---|---|---|---|---|
| 2011/0119571 | A1* | 5/2011 | Decker | G06F 16/9574 |
| | | | | 715/205 |
| 2011/0302510 | A1* | 12/2011 | Harrison | G06F 16/957 |
| | | | | 715/760 |
| 2013/0111595 | A1* | 5/2013 | Amit | G06F 21/577 |
| | | | | 726/25 |
| 2013/0124513 | A1* | 5/2013 | Bignert | G06F 16/353 |
| | | | | 707/728 |
| 2013/0212465 | A1* | 8/2013 | Kovatch | G06F 40/143 |
| | | | | 715/234 |
| 2014/0281902 | A1* | 9/2014 | Feuerlein | G06F 16/958 |
| | | | | 715/234 |
| 2014/0283033 | A1* | 9/2014 | Anand | H04L 63/1441 |
| | | | | 726/22 |
| 2014/0359412 | A1* | 12/2014 | Decker | G06F 16/9558 |
| | | | | 715/205 |
| 2014/0380454 | A1* | 12/2014 | Sakata | G06F 21/606 |
| | | | | 726/11 |
| 2017/0011029 | A1* | 1/2017 | Chatterjee | G06F 16/35 |
| 2018/0373803 | A1* | 12/2018 | Shultz | G06F 3/0482 |

OTHER PUBLICATIONS

Arc90 Inc., Readability.js source code listing, 2010, https://github.com/mozilla/readability/blob/master/Readability.js, accessed Dec. 31, 2019, pp. 1-43.

C. Kohlschütter, et al., Boilerplate Detection Using Shallow Text Features, WSDM '10, 2010, https://www.l3s.de/~kohlschuetter/publications/wsdm187-kohlschuetter.pdf, accessed Dec. 31, 2019, pp. 1-10.

Google, Inc., DOM-Distiller, README.md, 2017, https://chromium.googlesource.com/chromium/dom-distiller/+/5da487862e6b079cfc8b8095b5b6fd23c86f20fa, accessed Dec. 31, 2019, pp. 1-11.

Google, Inc., DOM-Distiller, Chrome Web Store entry, https://chrome.google.com/webstore/detail/dom-distiller-reading-mod/oiembdaoobijmdmeobkalaehgifealpl?authuser=1, accessed Dec. 31, 2019, pp. 1-7.

Apple, Inc., SafariReader Developer Documentation, https://developer.apple.com/documentation/safariextensions/safarireader, accessed Dec. 31, 2019, pp. 1-3.

Apple, Inc., Working with Safari Reader, https://developer.apple.com/library/archive/documentation/Tools/Conceptual/SafariExtensionGuide/WorkingWiththeReader/WorkingWiththeReader.html, accessed Dec. 31, 2019, pp.

* cited by examiner

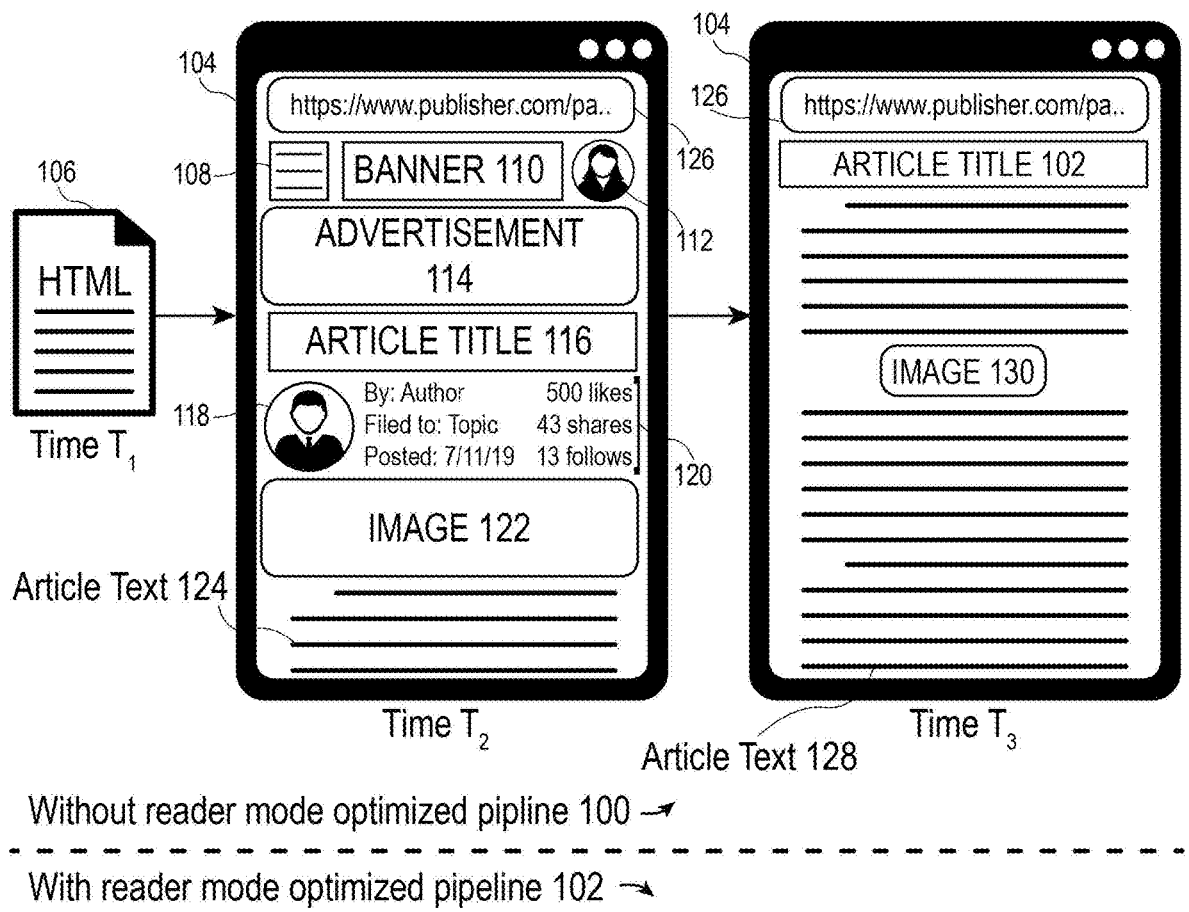
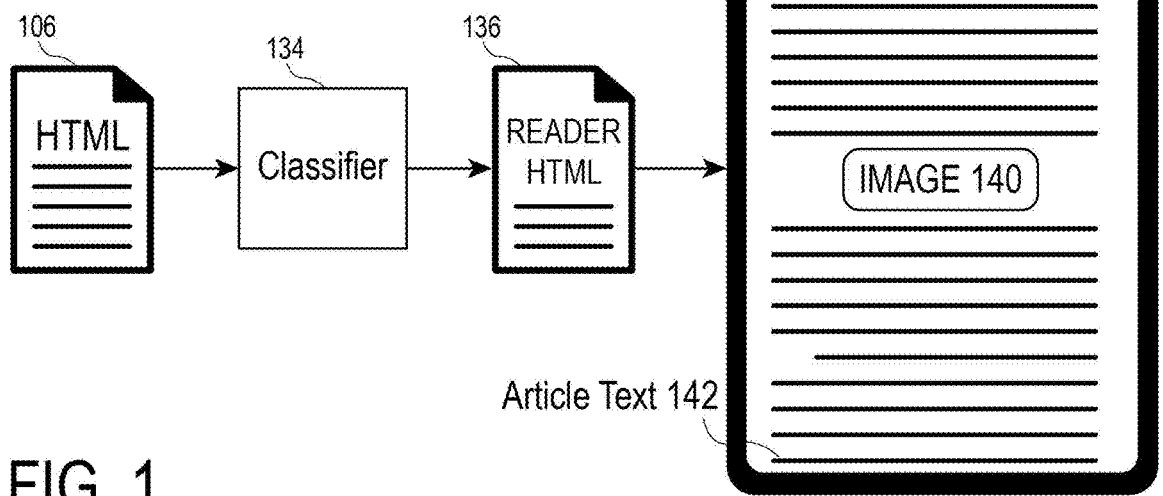
FIG. 1

3.1 Classifier Design

| Number | Name | Description |
|---|---|---|
| 1 | p | number of <p> |
| 2 | ul | number of <ul> |
| 3 | ol | number of <ol> |
| 4 | dl | number of <dl> |
| 5 | div | number of <div> |
| 6 | pre | number of <pre> |
| 7 | table | number of <table> |
| 8 | select | number of <select> |
| 9 | article | number of <article> |
| 10 | section | number of <section> |
| 11 | blockquote | number of <blockquote> |
| 12 | a | number of <a> |
| 13 | images | number of <img> |
| 14 | scripts | number of <script> |
| 15 | text_blocks | number of text blocks with more than 400 characters (excluding spaces) and are wrapped between 1-11 HTML tags |
| 16 | words | number of words in text_blocks |
| 17 | url_depth | number of subdirectories in URL path |
| 18 | amphtml | 0/1: supports Google AMP |
| 19 | fb_pages | 0/1: has Facebook channel ID |
| 20 | og_article | 0/1: has Open Graph article type |
| 21 | schema_org | 0/1: has schema.org Article/NewsArticle |

Table 1: List of all features the classifier uses to predict readability.

FIG. 5

READER MODE-OPTIMIZED ATTENTION APPLICATION

BACKGROUND OF THE INVENTION

When consumers of electronic media focus their attention, in particular when browsing the web in a web browser, often additional matter (e.g., "web bloat" or "un-useful page elements") that likely are not of interest to the user accompanies delivery of the media that is of interest to the consumer. The additional matter can be viewed as merely a nuisance detrimental to the user experience, for example, cluttering the web page, wasting display resources, slowing page load times significantly and more. The additional matter can also, however, take on a more harmful aspect if it includes executable code (e.g., JavaScript in a web browser) that consumes computing resources and performs actions the user does not desire such as load web trackers, load ads, load malicious or privacy-reducing code, etc. The bloat thus produces less desirable usability and potentially harm to the user's privacy and security.

Accordingly, there is a need for an attention application with a reader mode-optimized render pipeline that can avoid fetching and rendering unwanted media content, thus improving user readability experience, save on system resources, avoid malicious code, and improve privacy, especially from web trackers.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 1 is a diagram comparing an attention application with an optimized render pipeline for reader mode against an attention application without a reader mode-optimized pipeline in accordance with some embodiments.

FIG. 5 is a table of an example classifier design for an attention application with a reader mode-optimized render pipeline.

Figure 2:
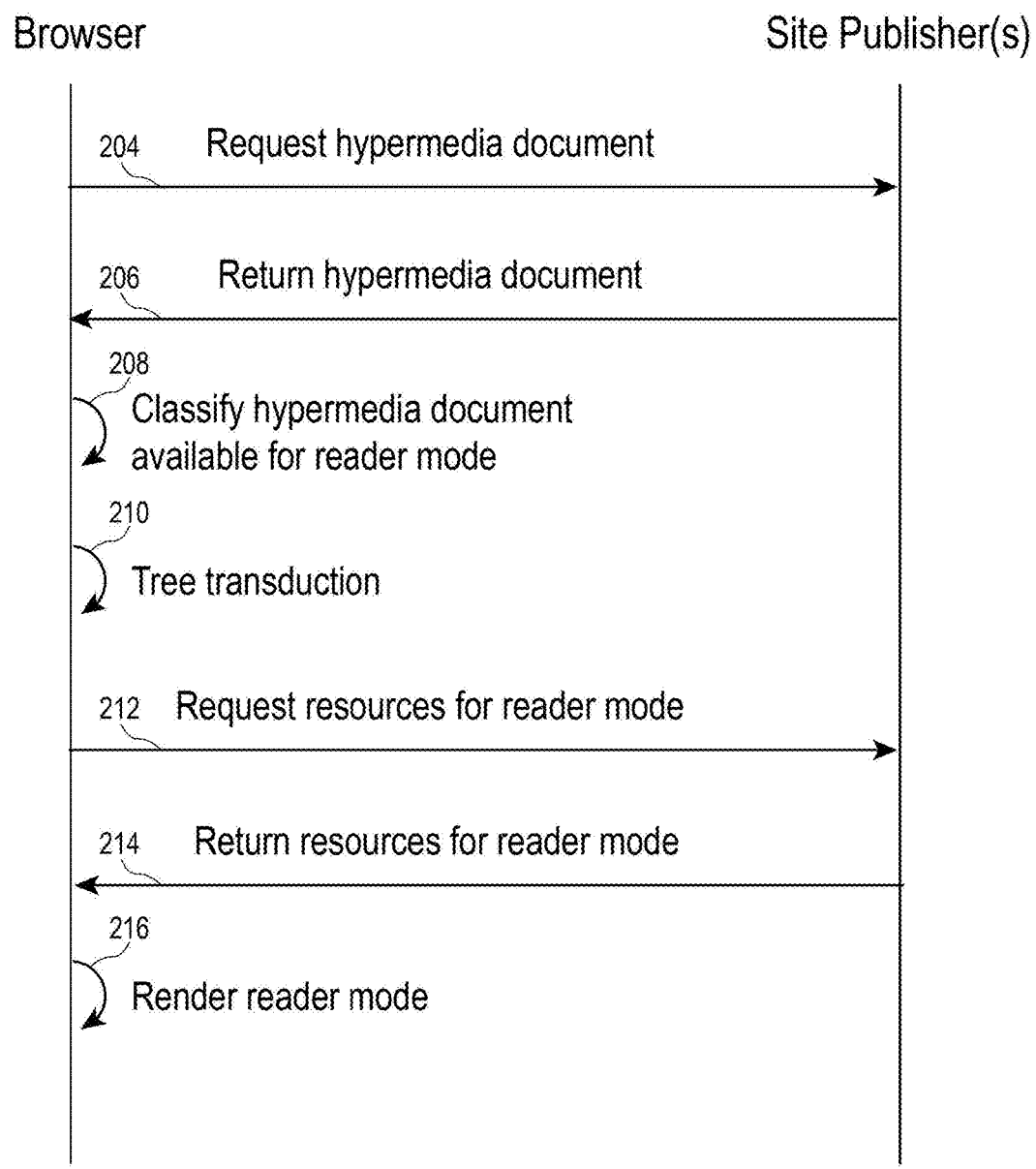
FIG. 2 is a signal diagram of an example interaction between an attention application with reader mode-optimized render pipeline and a web server in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Attention applications are high-interaction computer programs that present media content to an end user. Example attention application include without limitation web browsers, e-readers, virtual reality (VR) systems, audio playback applications (e.g., music, podcasts, lectures, etc.), gaming systems, video delivery systems, applications for browsing specialized content (e.g., online forum browsers), etc. Attention applications may run on generalized computer hardware (e.g., desktop computer, laptop, smart phone, tablet) and/or specialized hardware (e.g., e-reader hardware, gaming system console, VR system).

Media content viewed by users of attention applications is often accompanied by much more than just the media content in which the user has interest and on which the user wishes to focus her attention (e.g., an article text and images related to the subject matter of the article). This unwanted additional matter (also referred to herein as "web bloat") may include elements such as site navigation, advertising related videos and images, comment sections, images and text related to different articles than the one on which the user wishes to focus her attention, and most computer programs executable in the attention application (e.g., JavaScript in a web browser). Web bloat may be measured in various ways, including total web page size, page load time, memory needed to load the page, number of network requests associated with loading the page, amount of scripts executed in the attention application, and the number of third parties contacted as part of the process of loading the page.

Typically, a "web page," as used herein, consists of a hypermedia document including links to a number of assets. When the attention application requests and receives the hypermedia document, it proceeds to make additional network requests to fetch the assets from their respective network locations. This process creates a data structure known as the DOM (Document Object Model) that represents the content displayed to the user at a point in time. The DOM may be further modified by executable programs (also referred to herein as "scripts") running in the attention application (e.g., JavaScript). Links to these DOM-modifying scripts may be triggered based on certain types of user interaction (e.g., hovering the cursor over an area of the rendered page). A DOM may be significantly altered by the application of the execution of the scripts, to the point where the material rendered to the user no longer closely resembles what was in the initially received hypermedia document.

According to one type of browser architecture, the term rendering means a browser engine and a JavaScript engine that work in concert via the shared DOM data structure. Creating and updating the DOM, which is the data structure that determines what is shown visually to the user, includes orchestration of all resource fetching and running of executable code in the browser via the JavaScript engine.

The unwanted additional un-useful matter on website can cause usability problems for the user such as adding clutter to the user readability experience, waste screen display resources, especially if the user of the attention application is viewing the content on a mobile device, devour bandwidth resources, and slow page load times (often significantly). Wasted bandwidth is particularly problematic on mobile data connections, which are more likely to be expensive and bandwidth capped. Web bloat and trackers have been measured to consume a quarter of mobile data bandwidth under typical browsing patterns on modern web sites.

Unwanted additional matter when consuming media content is also a leading cause of privacy and security problems for users of attention applications. Users of attention applications tend to leak private information as they consume media content. Of all types of attention applications, web browsing in particular exposes users to scrutiny from trackers who assemble and sell classification and interest profiles of users to advertisers and media publishers. Users are often not aware that trackers follow them all around the web, even on media publishing sites that users believe are unrelated to the trackers. Abusive web trackers are almost always implemented by computer code executable in the attention application (e.g., JavaScript). Third party contact when loading a web page is becoming increasingly rife when surfing the web, and is often viewed as being problematic with respect to preservation of the user's privacy and security, especially when the user does not know the identity of the third parties and has not consented to their inclusion in the user's use of the attention application.

Certain pieces of information that should be private to the user relating to sensitive information can be thus exposed to anonymous strangers such as the browser's query log, browsing history, sharing activity, purchase history, map and travel queries, etc. Even when a user makes a direct request to a website without using a search engine, the DNS query can reveal the user's visit to the website without the user's permission or even knowledge. The user experience can take on a creepy feeling due to targeting ads but also delivers poorly targeted ads since not even the most ubiquitous trackers see all of a user's attention activity. Some websites, such as news sites, typically host dozens of trackers that slow page load times and devour the user's bandwidth.

One way to combat encroachment of unwanted additional matter is for the attention application to include a "reader mode," wherein a second version of a website can be rendered that attempts to omit some or all of the unwanted bloat content from the display of the content to the user of the attention application. This approach to reader modes introduces disadvantages due to the position of the reader mode in the web browser's rendering pipeline because the web browser fully loads and renders the page before applying a reader mode conversion.

One resulting disadvantage of existing reader modes is that reader mode actually delays loading of the page even more without because the browser fully loads all the bloat, then renders the page a second time in reader mode. Another disadvantage is tiresome user experience because the user sees the bloat-version of the web page render first, and then must either click or tap a "reader mode" button to convert to the reader mode version of the page. If the user applies the reader mode automatically applied to all websites, then the user experience can feel jarring when the attention application renders a web page with bloat, then, often after the user has begun to read the content, the web page disappears, interrupting the user, and the user has to wait again until the reader mode version is ready for display.

Another disadvantage of existing reader mode on web browsers is that they do not address the security and privacy problems of loading unwanted executable code. It is the executable code that is almost always responsible for breaching the user's privacy, contacting third parties with information about the user's attention habits and history without the user's consent, and tracking the user across the web. If the reader mode conversion executed after a full-page load and render, then it is too late to do anything about the web trackers and privacy infringement because it has already happened.

Disclosed herein is an attention application with an alternative multistep pipeline (also referred to herein as a "reader mode-optimized pipeline") that improves readability, performance, security, and privacy. In one example, if the reader mode-optimized pipeline classifies a web page to be reader mode compatible, the attention application renders the reader mode version before tree transduction and does not ever render the bloat version at all. Instead of a post-render feature to clean up the clutter on a web page, the reader mode-optimized pipeline avoids loading and rendering the bloat at all. If a page is deemed by the classifier to not be reader mode compatible, then the attention application may run tree transduction and render the resulting non-reader mode version of the page. As with existing reader modes, not all web pages may be deemed compatible with reader mode. But unlike existing reader modes, then there will be savings in resource consumption and increased privacy for compatible pages compared to the non-optimized tree transduction and render pipelines.

In the past, reader modes may not have effectively classified compatible material well enough for it to be practical to enable reader mode all the time. Disclosed herein a classification system that can improve detection of reader mode compatible pages such that the classifier can run on every web page visited by the user and all compatible pages rendered without any bloat in reader mode (e.g., "always on"). When applied to all web pages visited by a user, the reader mode-optimized pipeline showed drastic speedups and bandwidth reductions compared to manual reader mode selection. The classification system disclosed herein detects reader-mode compatible pages based on one or more of: the number and types of HTML tags appearing in a hypermedia document; the content and content size of particular types of HTML tags (e.g., <p>, <q>, <ul>, and others); position of particular HTML tags in the hypermedia document; and/or a partial tree transduction in which some but not all elements of the page are rendered before input to the classifier.

FIG. 1 is a diagram comparing an attention application with an optimized render pipeline for reader mode 102 against an attention application without a reader mode-optimized pipeline 100 in accordance with some embodiments. Both the areas 100 and 102 illustrate an attention application rendering media content, in this example rendering a web page, as it appears to the user.

Starting with 100, the non-optimized pipeline, a user of the attention application 104 requests media content delivered in hypermedia document 106 at time $T_1$, such as a document returned by a GET request to the attention application from a web server. After receipt or partial receipt of the hypermedia document 106, the attention application 104 fetches resources linked in the hypermedia document 106 and in executable code referenced by the hypermedia document 106 and renders page elements visually to the user. It will be explained what is meant in this disclosure by the term "rendering." Although Time $T_2$ shows a web page with all elements in the window displayed, the rendering process is incremental, and the various elements may be displayed as they are processed by the attention application 104. In the present content of a web browser, first a fetching operation makes network requests to obtain resources referenced by the hypermedia document 106. Next, a transducing operation builds a DOM (Document Object Model) based on the hypermedia document 106 and resources referenced therein. The DOM is expected to be in a tree format and the transducing operation may also be referred to as tree transduction. Unlike a static HTML document containing merely content and markup tags, the hypermedia document 106 may contain references to executable code (e.g., JavaScript) that, upon execution, alters the DOM after or during its initial formation. A current window view in the attention application 104 visible to the user may reflect a current state of the DOM, even while it is being transduced by the attention application 104.

At time $T_2$, the tree transduction and rendering process is complete, or at least in a stable state, and the user is thus presented with the media content of the web page with full bloat. Examples of bloat page elements are illustrated in FIG. 1, including navigation button 108, site banner 110, user icon 112, advertisement 114, author icon 118, and social sharing stats 120. Other types of visual bloat elements not shown in FIG. 1 may include page navigation elements, comment sections, additional advertisements, and any elements consuming screen space that are not of interest to the user. The elements that are of interest to the user are typically is text 124 and image(s) 122 associated with the content of an article or page, and not advertisements, content, video, text, and/or links unrelated to the thematic substance of the article (also referred to herein as "un-useful" page elements). Some navigation information such as URL address bar 126 could be considered of interest to the user, but some users may not.

When the user flow is at Time $T_2$, the user may select to switch to reader mode, usually through a dedicated reader mode button, by clicking on the menu button 108, or as integrated into the URL address bar 126. To switch to reader mode, the workflow advances to Time $T_3$, wherein the page has been rendered again, but now without most or all of the un-useful page elements. The attention application has determined which page elements are likely to be un-useful to the user and has rendered a subset of those elements based on the hypermedia document 106. Still rendered are those elements deemed likely to be of interest to the user, namely article text 128, image 130, and URL address bar 126. In some implementations any one or more particular of these types of elements could be omitted (e.g., no URL address bar 126, text-only, images-only, audio-only, etc.).

The workflow from $T_1$ to $T_3$ can be viewed as including an unnecessary step at Time $T_2$ wherein the bloat page is rendered only to be replaced with another version of the web page upon switch to reader mode at Time $T_3$. The bloat page render wastes time and system resources because it involves rendering unwanted elements and program code execution can be expensive in terms of processor cycles. The user experience is uneven jarring to the user. There is also legitimate security and privacy harm to the user: it is likely that loading the bloat page involves a potentially very large number of data-mining network requests to third parties in the form of web trackers. Switching to reader mode at Time $T_3$ does nothing to stop harmful network requests that had already been made earlier in the pipeline.

Focusing now on the attention application with optimized reader mode pipeline 132 in area 100, there is a different workflow than in the example of the non-optimized attention application 104. As in the non-optimized example, the workflow begins with hypermedia document 106, but the next step in the workflow is different than in the above example. Instead of starting to render page elements as soon as a DOM has begun to be formed via tree transduction (e.g., as the HTML document 106 is received), which may be viewed as a speed optimization, the attention application 132 first performs a classification to determine whether a web page is compatible with reader mode. The classification may be delayed until the entire or substantially all of the hypermedia document 106 has been received over the network.

Unlike the non-optimized pipeline, if a web page is deemed to be compatible with reader mode, then the optimized render pipeline switches to reader mode strictly before the display, rendering, and resource fetching steps that would have followed receipt of the hypermedia document 106 in the non-optimized pipeline. In the optimized reader mode pipeline, the optimized reader mode element can be thought of as a function that sits between the attention application's network layer, and returns either the received hypermedia document to the render engine when there is not a reader mode compatible subset of the document, or returns a greatly simplified version of the hypermedia document 136 representing the reader mode presentation of the web page.

In one implementation, the classifier 134 considers only features available in the hypermedia document 106 and/or the URL corresponding thereto, which achieves a performance improvement that is orders of magnitude better than non-optimized pipelines. Reasons for the performance gains include never fetching or executing scripts or style resources (e.g., Cascading Style Sheets (CSS)), fetching far fewer images and videos since images and videos not core to the presentation of the page are never retrieved, makes far fewer network requests to far fewer third parties (in some cases, zero), saving computing resources from not rendering animations, videos, and/or complex layout operations since the optimized reader mode pipeline are generally simple.

The output of the classifier is the reader mode hypermedia document 136, which can then be rendered as shown in window 132 with article text 142, image 140, and address bar 144, but without the other bloat elements rendered as in the example 100. Rendering the reader mode version in window 132 involves fetching only the resources referenced by the reader version of the hypermedia document 136, and not fetching the bloat elements referenced or created by executing the initial hypermedia document 106. These bloat elements are skipped entirely in the optimized pipeline 102.

This approach represents a novel approach to reader mode on an attention application by combining a machine-learning driven approach to checking whether content can be transformed to text-focused representation for end-user consumption. Applicability of this approach is high, as demonstrated in experimentation with 22.0% of web pages being deemed convertible to reader mode from the dataset of popular Alexa pages, and 46.27% of pages shared on social networks being reader mode readable. The approach has superior privacy protection, effectively removing all trackers from the tested pages, and dramatically reducing communications with third parties. The approach blocks ads at least as well as existing ad blocking tools, blocking 100% of resources labeled as advertising related in a crawl of 91,429 pages, without the need to use hand curated, hard-coded filter lists. Finally, the lightweight nature of reader mode content results in huge performance gains, with up to 27× page load time speedup on average, together with up to 84× bandwidth and 2.4× memory reduction on average.

FIG. 2 is a signal diagram 200 of an example interaction between a web browser attention application with reader mode-optimized render pipeline and a web server media site publisher in accordance with some embodiments. The browser requests a hypermedia document from the site publisher at operation 204. The operation 204 may be a GET request over HTTP or other suitable network communication protocols. In response, the site publisher returns the hypermedia document to the browser in the operation 206.

Once the browser has the hypermedia document, it can perform a classification step 208 to determine if the hypermedia document is compatible with reader mode (also referred to herein as the hypermedia document being "readable"). In some implementations, only a subset of the hypermedia document may be compatible with reader mode in this operation. In some implementations, the classification operation 208 is performed solely on the complete hypermedia document (e.g., based on the types and content of HTML tags in the hypermedia document).

Classification may be predicted based on the HTML of the hypermedia document but not based strictly on the HTML alone. Certain display features, as one example, could be predicted from the hypermedia document and relied upon to decide whether the overall page is readable without necessarily rendering the hypermedia document. For example, whether an image is present at a certain x/y offset may be revealed by the HTML and indicate a compatible page. In other examples, idioms and patterns can be used to predict the display of the page given the HTML of the page. A hero section, if present, may indicate that a page is readable. In another example, if a form element is near the top of the page, this might indicate that interactivity is important on the page, and the page is thus not a good candidate for reader mode. In other examples, a form at the bottom of the page may indicate that interactivity is ancillary to the page and thus may be omitted from the reader mode version without harming page usability.

In other implementations, the classification operation 208 includes execution of some executable code and layout, for example first-party scripts could be allowed to run while still blocking third-party scripts or scripts that make network requests to third-party sites. Aspects of the layout or display features could be used to recognize articles or other content likely to have readable subsets.

If the operation 208 does classify the hypermedia document as being reader mode readable, then a tree transduction operation 210 extracts the page elements found to constitute the readable subset of the hypermedia document received in operation 206. In implementations, the tree transduction operation 210 greatly simplifies the hypermedia document by remove most of the markup. Various tree transduction strategies may be used (e.g., ReadabilityJS, DOM Distiller, Safari Reader View, BoilerPipe, and others), each having tradeoffs with respect to the particular type of content deemed to have readable content and the speed with which the transducer runs on the hypermedia document. Distinct from the classification operation 208, which only determined whether a hypermedia document was "readable," the tree transduction operation 210 takes the hypermedia document as input and the output is the readable subset of the page, if any. Features that may be taken into account when determining whether a markup tag is included in the set of reader content not culled from the hypermedia document include: normalizing the contents of the text-and-link dense element to remove styling and other markup; looking for near-by images for inclusion; using text patterns identifying the page's author, source, and publication date; elements with high text and anchor density; presentation-level heuristics, including where elements appear on the page and what elements are hidden from display by default; number of words and link density features. Tree transducing approaches that rely simpler calculations (e.g., word count inside a markup tag) are cheaper computationally and likely will run faster than more complicated calculations.

In some implementations, accessibility features are emphasized in the tree transduction operation 210. Accessibility features includes features that may assist users with communicative and/or motor control impairment issues who may not be able to read or interact with an attention application in the normal way (e.g., users who are vision impaired, deaf, unable to use mouse, keyboard, or trackpad, etc.). Typically, these users employ accessibility settings on their operating system and/or stand-alone software to help convey the information of the website (e.g., braille pad, text-to-speech, magnification of text and/or video, specialized input controls, etc.). One way these solutions may work on a web page is to render HTML differently than normal to emphasize features relevant to accessibility. It can be difficult to accurately render a modern web page in the desired accessible way due to page complexity (e.g., complex bloat page). The reader mode version, on the other hand, is likely to work more seamlessly with the accessibility due to the clean, semantic markup of the reader page in comparison to the bloat page. In addition, the tree transduction 210 operation may alter features including font size, video size, and more to aid in accessibility, and may present user controls to refine and/or set user accessibility preferences in the reader mode presentation of the page.

In the requesting operation 212, the attention application fetches only the resources included in the simplified reader mode version of the hypermedia document resulting from the tree transduction operation 210. The browser receives the resources in operation 214 and renders only those page elements to the user in operation 216.

Figure 3:
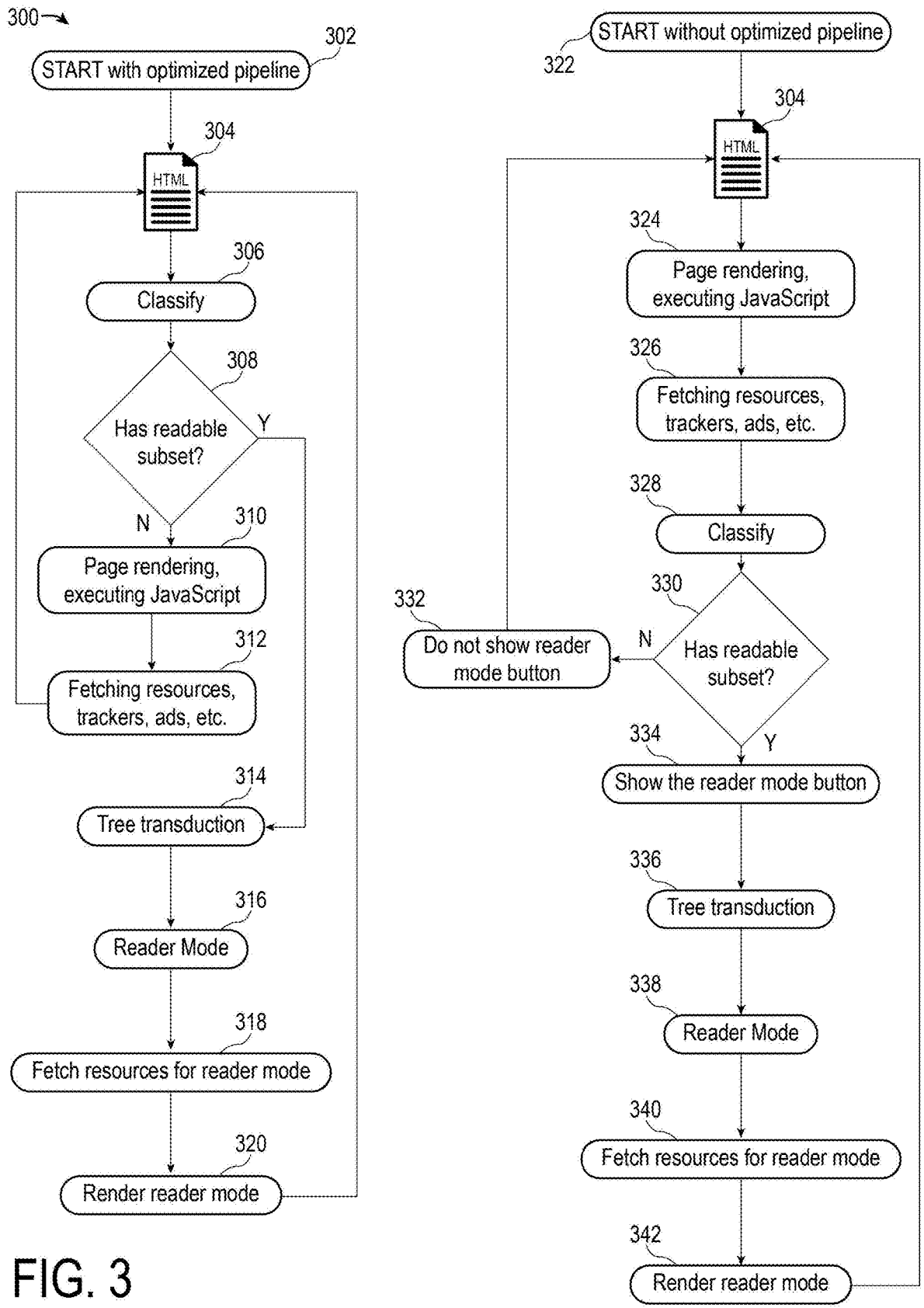
FIG. 3 illustrates two flowcharts comparing an example workflow of an attention application with reader mode-optimized render pipeline against a workflow of an attention application without reader mode-optimized render pipeline in accordance with some embodiments.

FIG. 3 illustrates two flowcharts comparing an example workflow of an attention application with reader mode-optimized render pipeline against a workflow of an attention application without reader mode-optimized render pipeline in accordance with some embodiments. The reader mode optimized pipeline starts at 302 wherein a hypermedia document 304 is received by the system. A classifier 306 determines whether the hypermedia document 304 is compatible with reader mode (e.g., is the document "readable"). Such a determination may be made in a variety of ways. One way is the novel classification system disclosed herein and described in more detail with reference to FIG. 5.

Decision block 308 depends on the output of the classifier at 306. If the classifier determines the hypermedia document does not have a readable subset, then the workflow proceeds to 310, wherein the attention application begins to render the hypermedia document, including formation of the DOM, execution of JavaScript or other executable code (e.g., web assembly), performing layout operations, etc. As the executable code runs and the page layout executed, network calls will be made at 312 to fetch resources, obtain ads, make calls to third-party trackers, potentially load other web pages or pop-up ads, etc. (e.g., it loads the bloat page). After the full page load, the workflow returns to 304 to receive the next hypermedia document in the user's browsing session. This workflow path is similar to what would happen with the non-optimized pipeline in every case, whether a hypermedia document is deemed readable or not.

The other option at 308 if the classifier does determine the hypermedia document has a readable subset is to proceed to tree transduction at 314. The term "tree" here refers to the data structure of the DOM, and "transduction" refers to the removing of page elements in the DOM that are not likely to include content of interest to the reader. It should be noted that, at this point in the workflow, the user has requested the hypermedia document 304 but nothing has yet been visually rendered to the user. Speed in loading media content in an attention application, in many cases, is a high value performance metric. Generally, the faster the content loads, the better. If content is slow to load, then a user becomes increasingly likely to "bail" on reading the content and to make another request to receive a different hypermedia document in the hopes that it will load faster. For many users, the "bail" point may be very short (e.g., not more than several seconds). Any step that slows page rendering therefore may be considered materially detrimental to the user experience. For this reason, tree transduction techniques may be chosen that speed selection and extraction of page elements deemed readable. For example, counting words and word density are likely faster (and less computationally expensive) than more complicated calculations. Although tree transduction 314 occurs before visual rendering of the media content, and thus may be seen as a performance risk, as shown herein, the performance costs of classifying and transducing before rendering are highly likely far outweighed by the performance savings from skipping operation 312 due to avoiding rendering the full bloat page and fetching resources required to do so.

Upon completion of the tree transduction 314, a reader mode version of the hypermedia document exists at 316. The attention application can then fetch resources referenced in the reader mode version only, without incurring the costs of fetching and rendering the initial hypermedia document 304. Render operation 320 is also much faster than render operation 310 because only a subset of the page elements need be rendered, and likely a small subset on modern web pages. Thus, time to render to operation 320 is likely far faster than time to render at operation 312. The user is thus presented with a faster, safer, more private, more readable experience than in the non-optimized pipeline.

Sometimes, a user may decide that reader mode is not wanted on a certain page or domain. It may be the case that reader mode is skipping content that is of interest to the user, or that an app running on the page is not behaving as expected and the user wishes to run it without reader mode. A user interface element (e.g., a button) may be presented to the user in operation 320 such that the user may, via the user interface element, place a domain on a list of domains on which reader mode should not be applied. In one implementation, the button moves a domain from which the hypermedia document that was used to generate the reader mode 320 is the domain moved to the blacklist. Thus, the next time the pipeline encounters the blacklisted domain at 308, execution of the workflow will proceed to 310 even if the classifier would have otherwise determined there to be a readable subset of the hypermedia document 304.

Turning now to the non-optimized pipeline starting at 322, the workflow starts with the same hypermedia document 304 as in the optimized pipeline case. The workflow then renders the page at 324, running executable programs referenced in the hypermedia document 304, and performing layout operations, which consumes system resources and takes time. Fetching operation 326 makes network requests to obtain the resources needed for rendering operation 324 (and may occur before operation 324 has completed). Operation 326 includes the privacy-harming requests, such as those to third-party trackers that conduct surveillance all over the web and mine the user's activity and classify the user (e.g., classified as belonging to a particular consumer group).

After the rendering operation 324 and fetching operation 326, a classifier 328 determines if there is a readable subset. At 330, if there is at least a readable subset, a reader mode button is shown to the user at 334. At 330, if there is not a readable subset, then no reader mode button is shown at 332 and the workflow returns to the next hypermedia document at 304. If the user clicks or taps the reader mode button presented at operation 334, then a tree transduction operation 336 extracts the reader mode subset 338, fetches resources for reader mode at 340, and renders the reader mode at 342. The workflow path to 342 is thus considerably longer and slower than in the optimized pipeline.

Figure 4:
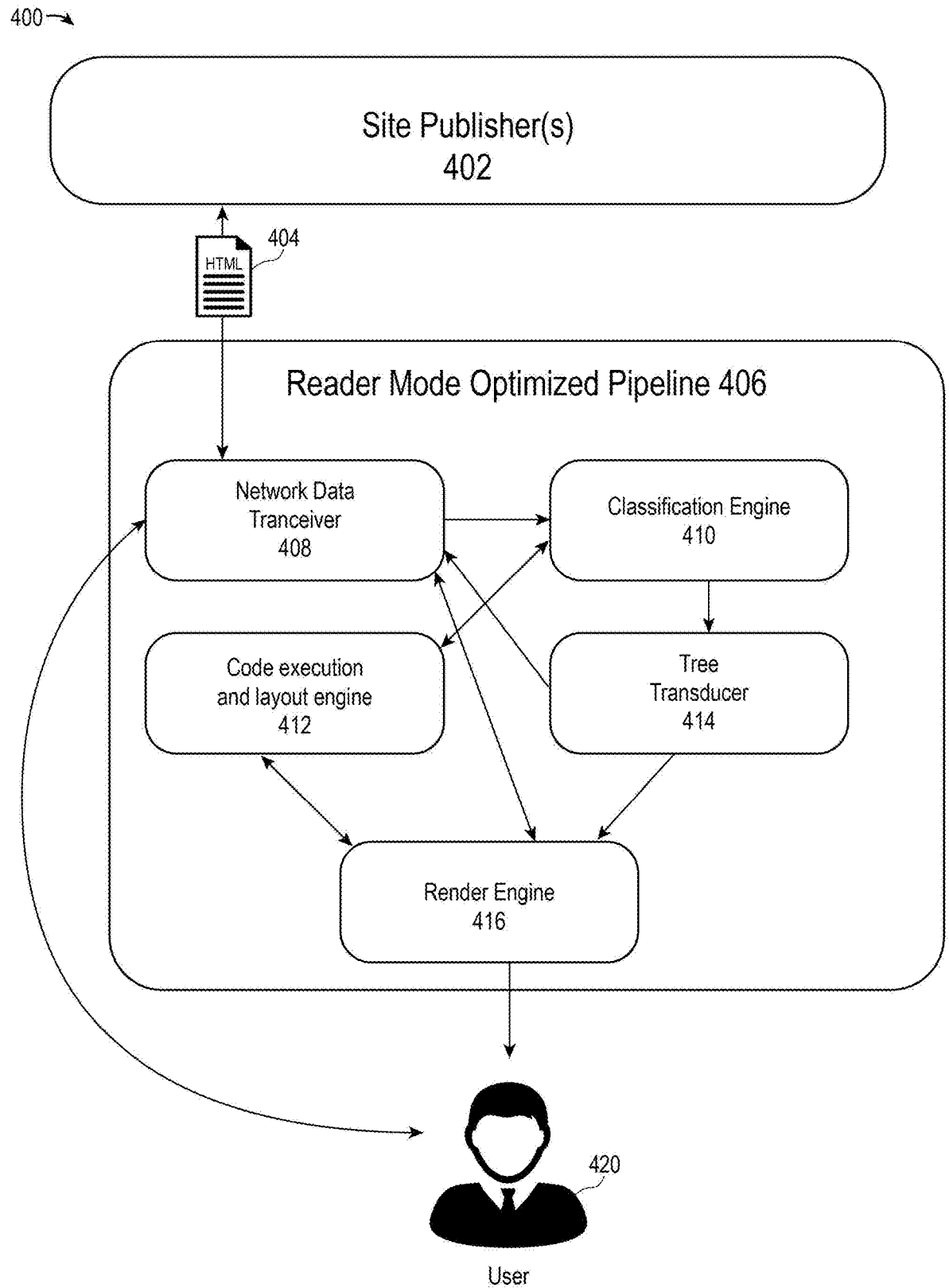
FIG. 4 is a block diagram of example components of an attention application with a reader mode-optimized render pipeline in relation to a site publisher.

FIG. 4 is a block diagram 400 of example components of an optimized reader mode pipeline 406 with a reader mode-optimized render pipeline in relation to a site publisher 402. The optimized reader mode pipeline 406 receives a hypermedia document 404 via a network data transceiver 408. The network data transceiver 408 may be included as part of generalized computer hardware running the optimized reader mode pipeline 406, such as an ethernet or Wi-Fi connection communicating on the internet. Other types of network data transceivers are possible, depending on the type of hardware running the optimized reader mode pipeline 406, such as a serial bus connection receiving the media content from another computer (e.g., an e-reader, music player, etc. loading content). The optimized reader mode pipeline 406 may be part of an attention application (e.g., a web browser running on desktop or mobile hardware) or it may be part of a content distribution network (CDN) that receives the hypermedia document 404 from the site publisher 402 and serves a reader mode version of the page to the user 420.

The network data transceiver 408 passes the hypermedia document 404 to the classification engine 410. The classification engine 410 may determine whether the hypermedia document 404 is "readable" based on a criteria, such as the classification scheme disclosed herein with reference to FIG. 5. Depending on the outcome of the classification engine, the hypermedia document 404 will be sent either to the tree transducer if readable or the code execution engine 412 if not readable.

The tree transducer 414 takes the hypermedia document 404 and extracts the readable subset. Several solutions exist for the extraction, including, for example, Readability.js, BoilerPipe, DOM Distiller, etc. Selection of the extraction algorithm may be optimized for various performance metrics (e.g., speed, resource consumption, etc.) but in general produce mostly similar reader mode versions of the page. When the reader mode version of the page has been created, it is forwarded to the render engine 416. The render engine 416 requests network data resources included in the reader mode version of the hypermedia document via the network data transceiver 408, which are expected to be significantly less than the initial hypermedia document 404 and may involve skipping all third-party network requests to web trackers. As the network resources are received, the reader mode page is rendered to the user 420 by the render engine 416.

Several of the components disclosed herein may have more than one "mode" optimized for a certain type of content consumption. Aspects of the classification and tree transduction that may work well on one type of content such as news articles, may not necessarily work well on other types of content, such as social media feeds or message boards. Social media feeds and message boards tend to have certain types of content that is known to be of interest to users such as author name and avatar, timestamp of a post, content of a post, name of thread in which the content was posted, whether the post or comment has a score associated with it, number of replied to a post, etc. The classification engine 410 and tree transducer 414 could thus have a "message board" and/or "social feed" optimized modes wherein page elements representing this specialized content remain in the reader mode version of the page. The components may switch into the specialized mode based on the domain from which a page has been retrieved (e.g., reddit.com for message boards, twitter.com for a social feed) and/or based on an analysis of the hypermedia document showing it contains elements indicating presence of the specialized content.

If the optimized reader mode pipeline 406 is a CDN, then the process is modified slightly. The optimized reader mode pipeline 406 is a piece of network infrastructure that is located between the user 420 and the site publisher 402. Generally, a CDN exists to bring performance gains by caching assets from the site publisher 402 that are likely to be requested by many users (e.g., a site banner). If the CDN is located closer to the user in terms of network topology, then a single request from the CDN to the site publisher 402 to get the asset avoids longer and slower requests from the user 420 to the site publisher 402. If there is a network of CDN servers, then most users can get the assets faster and with less resource strain on the site publisher 402.

If the optimized reader mode pipeline 406 is the CDN, then it is possible to receive a request from the user 420 for the hypermedia document 404, to receive the hypermedia document 404 from the site publisher 402 (or to retrieve a previously cached copy thereof), convert the hypermedia document 404 to a reader mode version, and return only the reader mode version to the user 420. Thus, by using the optimized reader mode pipeline CDN, the user 420 need not run its own optimized reader mode pipeline but can still receive reader mode versions of hypermedia documents.

This implementation differs from other implementations disclosed herein in that the process begins with the a request by the user 420 to the network data transceiver 408 for the hypermedia document 404, followed by the network data transceiver requesting the hypermedia document 404 from the site publisher (or retrieving a previously cached copy, if a fresh one is available) before submitting the hypermedia document 404 to the classification engine 410. The CDN implementation also differs from the other implementations in that after the tree transducer 414 generates the reader mode version of the hypermedia document 404, the reader mode version is not sent to the render engine 416, but rather is transmitted to the user via the network data transceiver 408.

FIG. 5 is a table 500 of an example classifier design for an attention application with a reader mode-optimized render pipeline. As noted herein, there is more than one approach to determining whether a hypermedia document has a readable subset of page elements and thus should be converted to reader mode or whether the page should be rendered as it was received. A classifier that does not correctly determine whether a page is readable in reader mode harms the user experience. Pages that would have been readable but were classified as not slow load times and deliver distractions unwanted by the user not related to the content of interest. Pages that should not have been rendered in reader mode but were classified as readable may present an unusable page to the user, which would be likely be regarded as a major design flaw.

The more accurate the classifier, the more likely the user is going to be able to run in "always on" mode. "Always on" mode means herein that the default behavior of the attention application is to try to render in reader mode and the attention application will try reader mode first on every page visited by the user before falling back to normal rendering if needed. Always on will result in the best speed, resource savings, and privacy enhancement over a non-optimized pipeline, but users may not like always on mode if they are shown, pages that omit content in which they users are interested (e.g., display only part of the text of an article), incomprehensible layouts, or otherwise too frequently cause impairment to their attention focused on the content. On the other hand, "always on" mode unlocks the performance gains of the optimized pipeline architecture disclosed herein because those gains arise from the fetching and rendering of far fewer resources compared to rendering the bloat page due to converting the hypermedia document to reader mode and avoiding rendering the bloat page at all.

The table 500 illustrates a criteria based on various markup tags that may be found in a hypermedia document that correctly determines whether a page has a readable subset well enough to be used in "always on" mode. Each markup tag in the criteria 500 is associated with a measurement value. In some cases, the measurement is simply the number of times the markup tag appears in the hypermedia document (e.g., <p>, <article>, <img>, etc.). In other cases, the measurement is a binary value representing whether the hypermedia document supports a certain feature, such as Google AMP or Facebook Channel ID.

Once the criteria described in table 500 has been collected for a particular hypermedia document, the resulting data is fed into the classifier. In one implementation, the classifier uses a random forest classifier, trained on a hand-labeled data set. The data set of websites for the random forest classifier were chosen to include three sets of 1,000 pages each. The first set of 1,000 pages are from the RSS feeds of popular news sites (e.g., The New York Times, ArsTechnica), which were expected to be frequently readable. The second set of 1,000 pages were the landing pages from the Alexa 1K, which were expected to be rarely readable. The final set of 1,000 pages were selected randomly from non-landing pages linked from the landing pages of the Alexa 5K, which were expected to be sometimes readable. In other implementations, the classifier may be trained in other ways, such as with other machine learning algorithms and/or differently chosen data sets.

A crawler was built that, given a URL to a web page, recorded both the initial hypermedia document response, and a screenshot of the final rendered page after all resources had been fetched and rendered, and after JavaScript executed. Of the set of 3,000 websites, 167 pages did not respond to the crawler, thus the set was reduced to 2,833. The data set is summarized as follows:

TABLE 1

| Page Data Set | Number of pages | % Readable |
| --- | --- | --- |
| Article pages | 945 | 92.9% |
| Landing pages | 932 | 1.5% |
| Random pages | 956 | 21.8% |
| Total | 2,833 | 38.8% |

To determine whether a page in the data set was "readable," each final page was manually considered and given a Boolean label of whether there was a subset of page content that was readable. A final web page was considered readable if it met the following criteria: the primary utility of the page was its text and image content and not interactive functionality; the page contained a subset of content that was useful, without being sensitive to its placement on the page, and the usefulness of the page's content was not dependent on its specific presentation or layout on the website. Based on these criteria, single page application, index pages, and pages with complex layout were generally labeled as not-readable, while pages with generally static content, and lots of text and content depicting media, were generally labeled readable.

The classifier takes as input a string, depicting an HTML document, and returns a Boolean label of whether there is a readable subset of the document. The input to the classifier, it should be clear, is the initial hypermedia document received from a web server, and not the final state of the website after JavaScript (or other program) execution (e.g., a current state of a DOM).

Speed is an important feature of the classifier design disclosed herein because document rendering is delayed during the classification process. The 21 features illustrated in table 500 were thus selected to be extractable quickly, and the criteria 500 does not include complex calculations that could be computationally expensive. Source code for an example implementation of the classifier is included herein as Appendix A. These classification results were found to be better than other available classifiers.

In another implementation, instead of the criteria 500, the classifier operates on markup features. Markup features are a set of information about the hypermedia document that includes markup tags (e.g., HTML, script tags, style tags, content tags, etc.) but can also include other information in addition to the tags themselves. Some markup features that are not tags include the URL of the hypermedia document. The URL may include information that could help a classifier determine that the hypermedia document referred to by the URL is or is not compatible with reader mode. There could be a list of URLs known to not be compatible with reader mode, and thus the classifier may obtain this list and check whether a current URL should be considered not readable, thus saving on classification time. In other implementations, a URL could be deemed readable based on the presence of a word in the URL, such as "article." In yet other implementations, the presence of a keyword in the URL could be given weight in the classifier, but is not necessarily dispositive of the issue whether the hypermedia document is readable or not.

Figure 6:
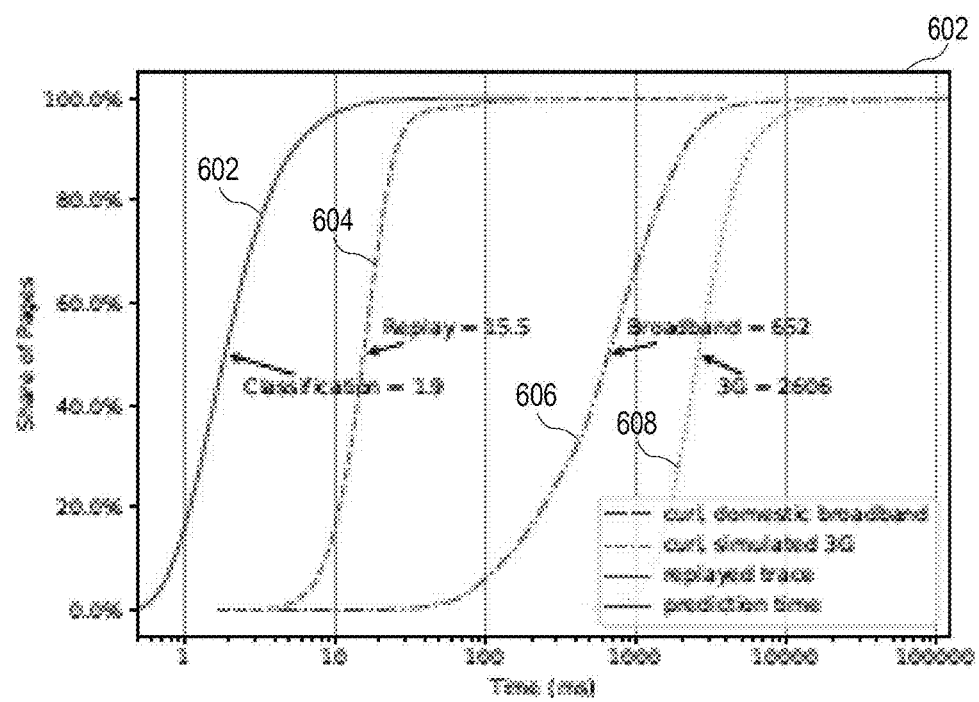
FIG. 6 is a set of plots illustrating performance characteristics of the novel classifier including distribution of key performance metrics of an attention application with a reader mode-optimized render pipeline.

FIG. 6 is a plot 600 illustrating performance characteristics of the novel classifier including time to fetch and classify an initial hypermedia document of an attention application with a reader mode-optimized render pipeline. As noted herein, the classifier operates on complete hypermedia documents before they are rendered. As such, the attention application is not able to render the page until the entire hypermedia document has been fetched. This is unlike non-optimized reader mode pipelines where pages may be progressively rendered as a speed optimization as segments of the hypermedia document are received, parsed, and resources therein fetched. There is thus a tradeoff between rendering delay and network and device resource use, since any page that is reader mode readable will fetch and process far fewer resources. If the rendering delay while waiting for classification to finish is too long, it could outweigh savings from "always on" reader mode.

In the plot 600, rendering delay caused by the classifier is illustrated under several representative network conditions. The rendering delay is equal to the time to fetch the entire initial hypermedia document and complete classification. The data presented in the plots 600 shows the rendering delay imposed is small, specifically compared to the dramatic performance improvements delivered when a page is readable.

The curve 602 shows how long the classifier took to determine if a parsed hypermedia document was readable. The classifier took 2.8 ms on average and 1.9 ms in the median case. The curve 604 shows a simulation cost time of serving each page from a locally hosted web server, which allowed for accounting of the fixed overhead in establishing the network connection, and similar unrelated browser bookkeeping operations. The replay time was 22.3 ms on average and 15.5 ms median time.

The next two curves, 606 and 608 represent two selected network environments of different network conditions and device capabilities web users are likely to encounter: a fast, domestic broadband link with 50 Mbps uplink/downlink bandwidth and a 2 ms latency (606), and a simulated 3G network with a default 3G preset with 780 kbps downlink, 330 kbps uplink, 100 ms packet delay in either direction and no additional packet loss. Downloading the pages on this connection took 1,372 ms on average and 652 ms median for the broadband (606) and 4,023 average and 2,516 median for the 3G connection (608).

Overall, the approximately 2.8 ms taken for an average document classification is a tiny cost compared to just the initial hypermedia document download on reasonably fast connection. The data is summarized as follows.

TABLE 2

| Measurement | # measured | # readable | % readable |
| --- | --- | --- | --- |
| Popular pages | 42,986 | 9,653 | 22.5% |
| Unpopular pages | 40,908 | 8,794 | 21.5% |
| Total: Random crawl | 83,894 | 18,457 | 22.0% |
| Reddit linked | 3,035 | 1,260 | 41.51% |
| Twitter linked | 494 | 276 | 31.2% |
| RSS linked | 506 | 331 | 65% |
| Total | 4,035 | 1,867 | 46.27% |

Figure 7:
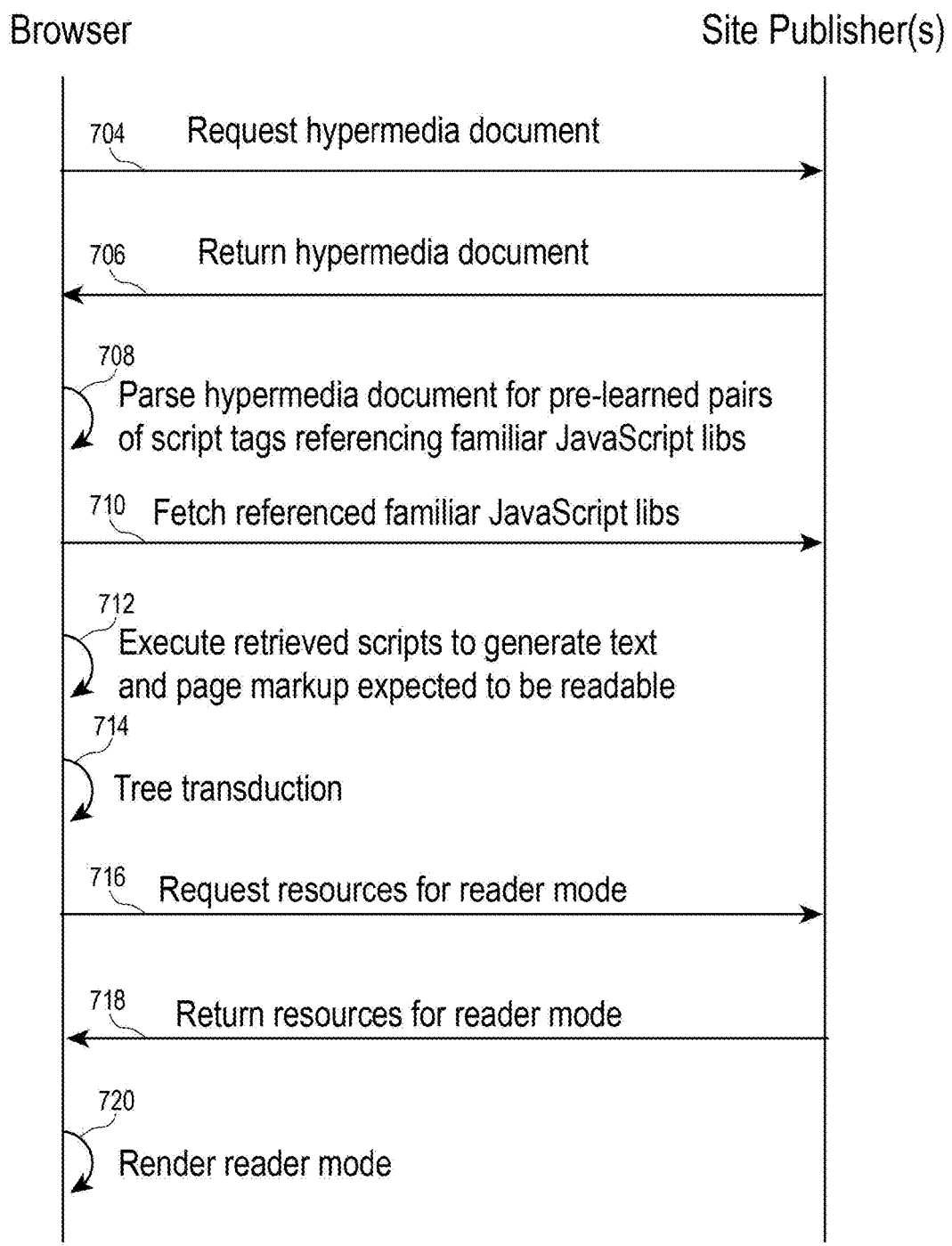
FIG. 7 is an example signal diagram illustrating application of a reader mode optimized pipeline including a partial render of a web page based on a partial render of a web page based on executing only a subset of page JavaScript code, by predicted predicting which JavaScript units will result in additional, "readable" page text.

FIG. 7 is an example signal diagram 700 illustrating application of a reader mode optimized pipeline including a partial render of a web page based on a partial render of a web page based on executing only a subset of page JavaScript code, by predicting which JavaScript units will result in additional, "readable" page text. In other examples, without predicted JavaScript execution, the classification parser operated solely on a hypermedia document received from a server, returning a Boolean to indicate the presence of a readable subset in the hypermedia document. In the example pipeline without predicted JavaScript, there was no running executable code (e.g., JavaScript, web assembly) in the attention application or performing layout or style operations. Among the benefits of running the classification parser only on the hypermedia document itself are speed, reduced resource use, safety, and privacy. In the workflow described with reference to FIG. 7, on the other hand, the parser may not operate solely on the hypermedia document received from the site publisher. Instead, a limited selection of predicted executable code could be run before the classification process.

Much of the security and privacy risk from running JavaScript or other executables in the browser arises from triggering network requests to third parties who are unknown to the user and who seek to infringe the user's privacy by triggering the network requests. The mere request itself can leak sensitive information pertaining to the user, even if only from a fingerprint of an HTTP request header. The third-party requests could also reveal sensitive information about the user such as information based on cookies accumulated during the user's prior browsing sessions and may be able to access sources of information private to the user (e.g., query log, browsing history, etc.). The third-party trackers essentially add no value to the user's experience but consume resources (computing and bandwidth), slow page loads, and harm security and privacy.

Thus, a strategy of avoiding the third-party network requests altogether is an attractive option for a user concerned about and wishing to improve safety and privacy. The upshot of deciding not to load any executable code or style at all, however, could also have drawbacks. Some executable code might actually load content of interest to the user. By not running the executable code, the user would miss content referenced therein in when reader mode. Some pages might be readable, but only if certain key executable code is run. There could also be layout operations and page presentation that the user wishes to have that would be left out if the page has not been rendered at all before going into the classifier.

There is thus an opportunity, in some implementations, to run only a subset of the executable code referenced by the hypermedia document, partially render a page based thereon, and then run the classifier to determine if there is a readable subset. Choosing which parts of the hypermedia document scripts to run is also referred to herein as predicted JavaScript. The signal diagram 700 illustrates such a process. The request 704 and return 706 operations are the same as in the other implementations. At 708, the workflow includes a parsing operation 708 to parse the hypermedia document for only designated pairs of markup, style, and/or script tags. The designated pairs may include pre-learned tags referencing familiar JavaScript or other executable libraries and page markup and/or text that those libraries use for generating readable content. Examples of designated tags include tags with URLs that resemble angular.js and page text with variable name text that resembles Angular (e.g., {{variable-name} } text). For example, if a script tag includes a URL to a script resource with the word "angular" in the path and there is a text tag with the double curly braces format, then it can be implied that there is a text substitution that would occur in the curly brackets if the script with the word angular has been run. Thus, this is a candidate to run predictive JavaScript before running the resulting document into the classifier.

If the attention application's classifier observes instances of the designated pairs, then the attention application fetches those libraries at 710, either from the site publisher's server or from another script hosting server. If the number of recognized tags and libraries is small, then it may introduce only minimal DOM changes and thus incur only a small computing resource and time overhead. The increase in costs may still be significantly outweighed by the savings in avoiding the bloat page load.

In some implementations, the pre-learned pairs include a subset of style features in the parsing operation 708. Examples of style features not removed from the reader mode version of the hypermedia document include brand identity such as brand logo and/or color scheme, page headers, page footers, etc. The style features may be chosen based on known elements on popular pages or may be chosen based on a combination of HTML and CSS feature analysis. The resulting reader mode page would thus retain the feel of the much more minimalist reader mode page, but with at least some presentation designating the origin of the media content.

In another implementation, the pre-learned pairs include a subset of navigation features in the parsing operation 708. Examples of navigation features retained in the reader mode version of the hypermedia document include a top navigation bar, page footer navigation, "related articles" content identified and extracted to a navigation area, links from within content text extracted to a "related articles" menu. As with the implementation wherein the reader mode page retains style information, the resulting reader mode page would thus retain the feel of the much more minimalist reader mode page, but with at least some navigation presentation for the user to navigate away from the page if desired and to related content that may be of interest to the user.

At 712, the browser executed the retrieved scripts to generate text and page markup expected to be readable. The operation 712 may include layout operations and execution of third party network request, if they are contained in the familiar JavaScript libraries. On the other hand, the familiar JavaScript libraries may be chosen to not include any third party network requests. After tree transduction at 714, the browser requests resources for reader mode at 716 and receives the resources at 718, then renders reader mode at 720.

Figure 8:
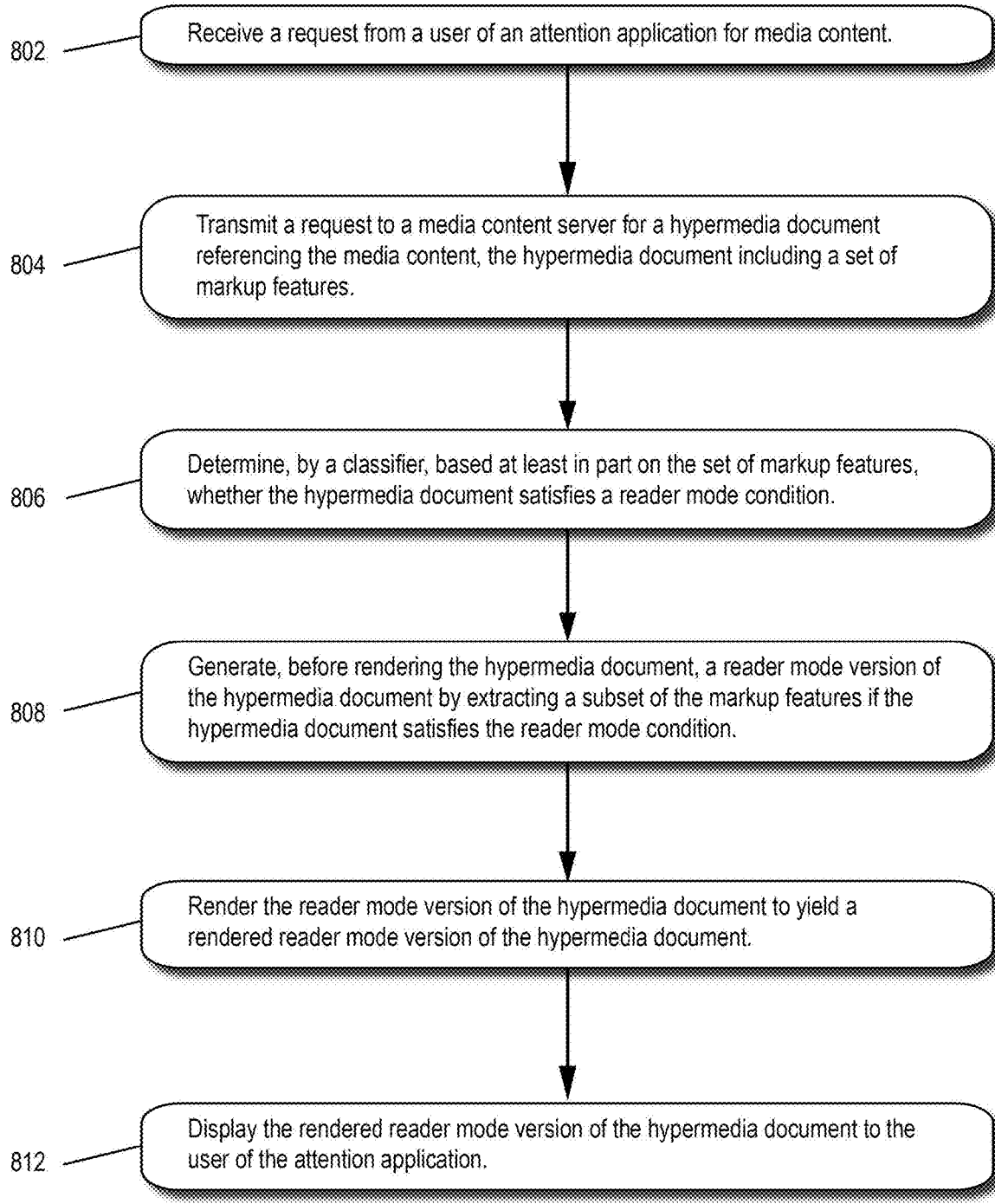
FIG. 8 is a flowchart of a method of an optimized reader mode on an attention application.

FIG. 8 is a flowchart of a method 800 of an optimized reader mode on an attention application. The method 800 includes a receiving operation 802 to receive a request from a user of the attention application for media content. The receiving operation may include clicking or tapping on a hyperlink or other signifier that media content is available. A transmitting operation 804 transmits a request to a media content server for a hypermedia document referencing the media content, the hypermedia document including a set of markup features. The markup features for example may be HTML tags determining how the content in the hypermedia document should be displayed to the user of the attention application. Other types of markup features may also be used.

A determining operation 806 determines, based at least in part on the set of markup features, whether the hypermedia document satisfies a reader mode condition. The determining operation 806 may be based on the number and type of markup features included in the hypertext document. In other implementations, the determining operation 806 is based at least in part on the contents of the markup tags (e.g., the number of words enclosed in a set of paragraph tags). Machine learning may be used to perform the determining step 806, such as by training the machine by manually reviewing and classifying a set of hypermedia documents. In implementations, the output of the determining operation 806 is a binary value indicating whether the hypermedia document satisfies the reader mode condition or not.

A generating operation 808 generates, before rendering the hypermedia document, a reader mode version of the hypermedia document by extracting a subset of the markup features if the hypermedia document satisfies the reader mode condition. As used herein, the term "extracting" may refer to stripping some sets of markup features from the hypermedia document but leaving others (e.g., stripping markup tags that are not likely to include content of interest to the user). Extracting may include modification of markup features and content based therein, such as combination of markup tags containing article text. Extracting, in other implementations, may include addition of markup tags, such as navigation, accessibility, video controls, etc.

A rendering operation 810 renders the reader mode version of the hypermedia document to yield a rendered reader mode version of the hypermedia document. The rendering operation may, for example, be performed by a web browser or other content portal (e.g., online forum browser) to build a page (e.g., to form a DOM) based on the reader mode version of the hypermedia document. If the hypermedia document includes executable code, style information, etc., then the rendering operation 810 may run that code and perform the layout operations. Not all layout, style, etc. markup information need be removed from the hypermedia document to form the reader mode version, although it may be. A displaying operation 812 then displays the rendered reader mode version of the hypermedia document to the user of the attention application.

Figure 9:
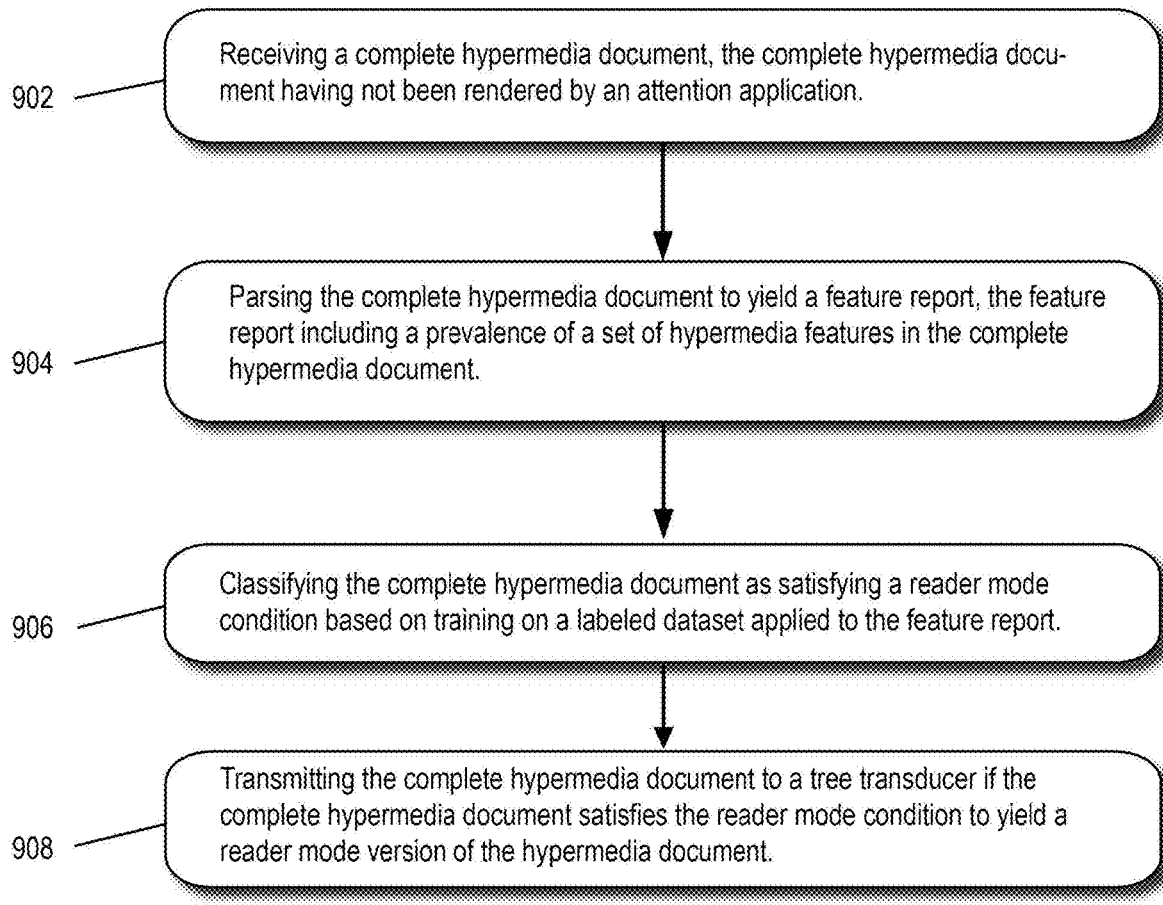
FIG. 9 is a flowchart of an example method of classifying a hypermedia document as compatible with an attention application reader mode.

FIG. 9 is a flowchart 900 of an example method of classifying a hypermedia document as compatible with an attention application reader mode. A receiving operation 902 receives a complete hypermedia document, the complete hypermedia document having not been rendered by an attention application. The type of hypermedia document received may depend on the type of attention application (e.g., a web page for a web browser, an e-book for an e-reader, etc.). A parsing operation 904 parses the complete hypermedia document to yield a feature report, the feature report including a prevalence of a set of hypermedia features in the complete hypermedia document.

A classifying operation 906 classifies the complete hypermedia document as satisfying a reader mode condition based on training on a labeled dataset applied to the feature report. A transmitting operation 908 transmits the complete hypermedia document to a tree transducer if the complete hypermedia document satisfies the reader mode condition to yield a reader mode version of the hypermedia document. The transmitting operation 908 may be by a content distribution network server situated between the user and the content provider. Instead of merely caching the hypermedia documents and assets referenced therein, the content distribution network server may perform the method 900 and distribute only the reader mode version of the hypermedia document to the end user. Thus, improvements to the operation of the classifier need not be pushed out to all attention applications, but rather the attention applications can make their network requests via the content distribution network and receive already "readerized" versions of the all the media content, regardless of whether their clients are configured with the optimized reader mode pipeline.

Figure 10:
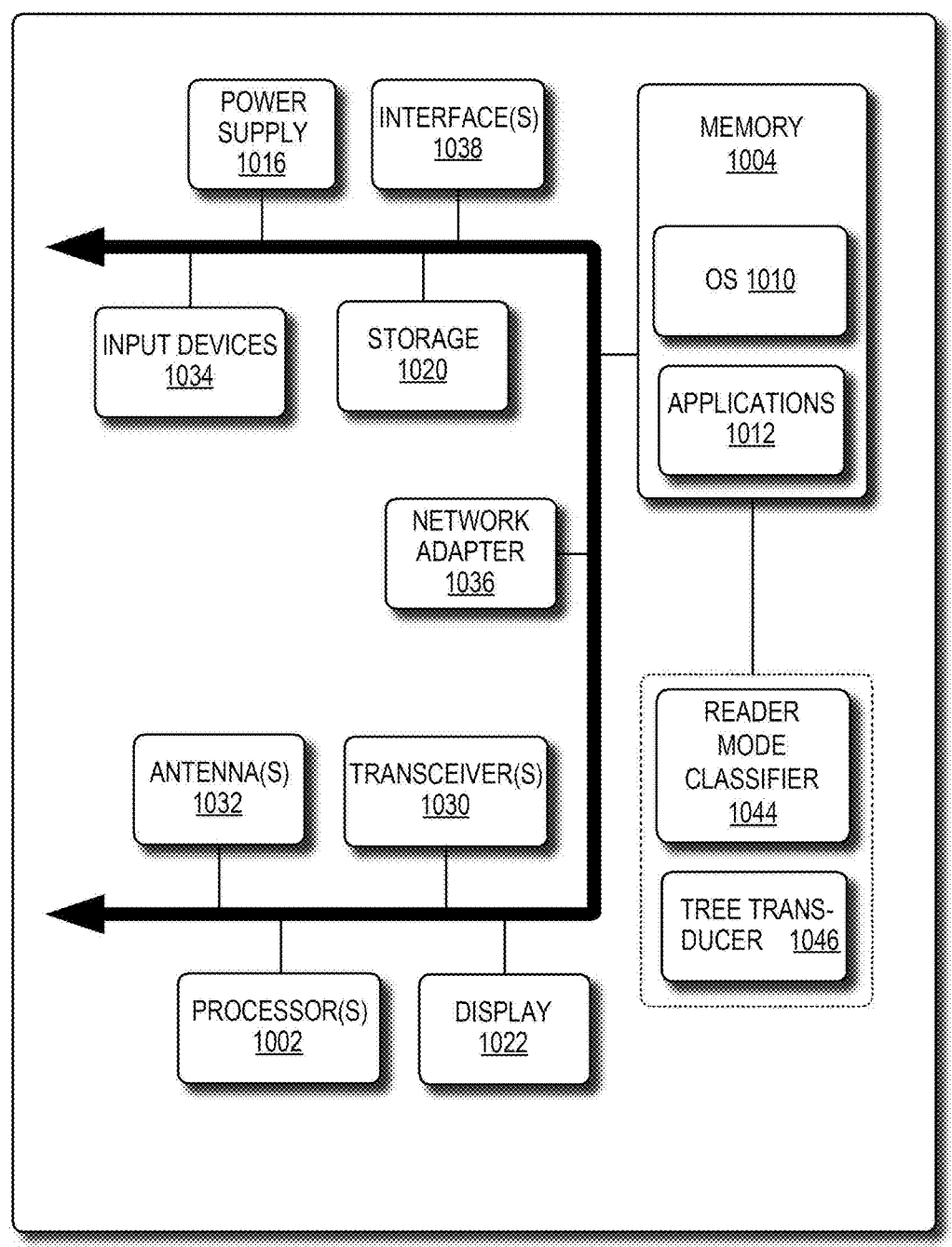
FIG. 10 illustrates a system that may be helpful in implementing an attention application with a reader mode-optimized render pipeline.

FIG. 10 illustrates a system 1000 that may be helpful in implementing an attention application with a reader mode-optimized render pipeline. FIG. 10 illustrates an example system (labeled as a processing system 1000) that may be useful in implementing the described technology. The processing system 1000 may be a client device, such as a smart device, connected device, Internet of Things (IoT) device, laptop, mobile device, desktop, tablet, or a server/cloud device. The processing system 1000 includes one or more processor(s) 1002, and a memory 1004. The memory 1004 generally includes both volatile memory (e.g., RAM) and nonvolatile memory (e.g., flash memory). An operating system 1010 resided in the memory 1004 and is executed by the processor 1002.

One or more application programs 1012 modules or segments, such as reader mode classifier 1044 and tree transducer 1046 are loaded in the memory 1004 and/or storage 1020 and executed by the processor 1002. In some implementations, the digital asset wallet 1044 is stored in read-only memory (ROM) 1014 or write once, read many (WORM) memory. Data such as extrinsic event data sources may be stored in the memory 1004 or storage 1020 and may be retrievable by the processor 1002 for use by digital asset wallet 1044 and the blockchain manager 1046, etc. The storage 1020 may be local to the processing system 1000 or may be remote and communicatively connected to the processing system 1000 and may include another server. The storage 1020 may store resources that are requestable by client devices (not shown). The storage 1020 may include secure storage such as one or more platform configuration registers (PCR) managed by one or more trusted platform modules (TPMs), which may be implemented in a chip or by the trusted execution environment (TEE).

The processing system 1000 includes a power supply 1016, which is powered by one or more batteries or other power sources and which provides power to other components of the processing system 1000. The power supply 1016 may also be connected to an external power source that overrides or recharges the built-in batteries or other power sources.

The processing system 1000 may include one or more communication transceivers 1030 which may be connected to one or more antenna(s) 1032 to provide network connectivity (e.g., mobile phone network, Wi-Fi®, Bluetooth®, etc.) to one or more other servers and/or client devices (e.g., mobile devices, desktop computers, or laptop computers). The processing system 1000 may further include a network adapter 1036, which is a type of communication device. The processing system 1000 may use the network adapter 1036 and any other types of communication devices for establishing connections over a wide-area network (WAN) or local area network (LAN). It should be appreciated that the network connections shown are exemplary and that other communications devices and means for establishing a communications link between the processing system 1000 and other devices may be used.

The processing system 1000 may include one or more input devices 1034 such that a user may enter commands and information (e.g., a keyboard or mouse). Input devices 1034 may further include other types of input such as multimodal input, speech input, graffiti input, motion detection, facial recognition, physical fingerprinting, etc. These and other input devices may be coupled to the server by one or more interfaces 1038 such as a serial port interface, parallel port, universal serial bus (USB), etc. The processing system 1000 may further include a display 1022 such as a touch screen display.

The processing system 1000 may include a variety of tangible processor-readable storage media and intangible processor-readable communication signals including in virtual and/or cloud computing environment. Tangible processor-readable storage can be embodied by any available media that can be accessed by the processing system 1000 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing system 1000. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter

The invention claimed is:

1. A method for an optimized reader mode-optimized pipeline on an attention application, the method comprising:
   receiving a request from a user of the attention application for media content during an attention session;
   transmitting a request to a media content server for an initial hypermedia document referencing the media content, the initial hypermedia document including a set of markup features;

determining, by a classifier and prior to generating a document object model (DOM) based on the initial hypermedia document via tree transduction, that a subset of markup features that are included in the set of markup features satisfy a reader mode condition;

extracting, by the classifier based at least in part on the reader mode condition being satisfied, elements of the initial hypermedia document and omitting elements of the initial hypermedia document outside the subset of markup features to yield a reader mode hypermedia document;

generating, by a tree transducer, without rendering the DOM based on every markup feature of the set of markup features of the initial hypermedia document during the attention session, a reader mode DOM based on the reader mode hypermedia document that omits the elements of the initial hypermedia document;

rendering the reader mode DOM by fetching only resources referenced by the reader mode hypermedia document and not fetching features outside the subset during the attention session; and displaying a rendering of the reader mode DOM to the user of the attention application during the attention session.

2. The method of claim 1, wherein rendering the reader mode DOM comprises:

fetching resources associated with the reader mode hypermedia document and does not fetch resources referenced by the initial hypermedia document that are outside the subset of markup elements.

3. The method of claim 2, wherein rendering the reader mode DOM comprises:

rendering the reader mode DOM by omitting web trackers included in executable code referenced by the initial hypermedia document.

4. The method of claim 1, wherein the attention application is a web browser.

5. The method of claim 1, wherein generating the reader mode hypermedia document comprises:

generating the reader mode hypermedia document that includes accessibility features.

6. The method of claim 5, wherein the accessibility features include video accessibility user controls.

7. The method of claim 5, wherein the accessibility features include font size user controls.

8. The method of claim 5, wherein the accessibility features include a text summarization tag containing a consolidated version of text present in the initial hypermedia document.

9. The method of claim 1, wherein the elements omitted from the initial hypermedia document to yield the reader mode hypermedia document define style features of the initial hypermedia document.

10. The method of claim 1, wherein the elements omitted from the initial hypermedia document to yield the reader mode hypermedia document define navigation features of the initial hypermedia document.

11. The method of claim 1, wherein the elements omitted from the initial hypermedia document to yield the reader mode hypermedia document define embedded video features of the initial hypermedia document.

12. The method of claim 1, further comprising:

receiving, from the user, an indication that future hypermedia documents received from a same domain as a domain that sent the initial hypermedia document should not be rendered in reader mode; and determining, by the classifier, that another hypermedia document does not satisfy the reader mode condition, the another hypermedia document being received from the same domain that sent the hypermedia document.

13. A reader mode-optimized attention system, the system comprising:

a network data transceiver that receives an initial hypermedia document from a media server over a network during an attention session, the initial hypermedia document including a set of markup tags and hyperlinks to media content therein;

a processor connected to the network data transceiver and a computer program memory storing instructions which, when executed by the processor, implement:

a classification engine that determines, prior to generating a document object model (DOM) based on the initial hypermedia document, that the initial hypermedia document satisfies a reader mode condition based at least in part on the set of markup tags and hyperlinks to media content therein;

a tree transducer that:

(a) determines, based at least in part on determining that the initial hypermedia document satisfies the reader mode condition, a subset of markup tags of the set of markup tags of the initial hypermedia document that satisfy the reader mode condition and extracts the subset of markup tags to yield a reader mode hypermedia document; and (b) generates, without rendering the DOM based on every markup tag of the set of markup tags of the initial hypermedia document during the attention session, a reader mode DOM based on the reader mode hypermedia document that omits markup tags of the initial hypermedia document outside of the subset of markup tags; and a render engine that generates, without rendering a DOM based on the initial hypermedia document during the attention session, a rendering of the reader mode DOM based on the reader mode hypermedia document for display to a user during the attention session.

14. The system of claim 13, wherein the reader mode condition is satisfied based at least in part on presentation properties of the set of markup tags.

15. The system of claim 14, wherein the presentation properties include cascading style sheet (CSS) classes associated with the initial hypermedia document.

16. The system of claim 13, wherein the classification engine applies a weighting to the set of markup tags to determine whether the initial hypermedia document satisfies the reader mode condition, the weighting being a result of a random forest classifier trained on a hand-labeled dataset of websites.

17. The system of claim 13, wherein the classification engine applies a reader mode criteria optimized for social media content.

18. The system of claim 13, wherein the classification engine determines whether one or more hypermedia documents received by the network data transceiver satisfies a reader mode condition based on preference input from the user.

19. The system of claim 13, wherein the instructions, when executed by the processor, further implement:

a speculative executable code identification engine to identify a subset of executable code associated with the initial hypermedia document if the initial hypermedia document does not satisfy the reader mode condition, the subset of executable code being rendered by the render engine to yield a partially rendered DOM, and the partially rendered DOM being returned to the classification engine for a determination of whether the partially rendered DOM satisfies the reader mode condition.

20. The method of claim 1, wherein determining that the subset of markup features satisfy the reader mode condition comprises:

evaluating a criteria that is based on a number of appearances of one or more markup tags in the initial hypermedia document, a number of text blocks that satisfy a threshold character length in the initial hypermedia document, a number of words the initial hypermedia document, an attribute in the initial hypermedia document that indicates one or more preconfigured document types, or a combination thereof.

21. The method of claim 1, wherein the omitted elements outside the subset of markup features comprise elements including a navigation button, a site banner, a user icon, an advertisement, an author icon, a social sharing stats element, navigation elements, comment sections, or a combination thereof.

* * * * *